United States Patent [19]

Saugeon

[11] Patent Number: 4,787,392
[45] Date of Patent: Nov. 29, 1988

[54] METHOD AND APPARATUS FOR DIGITAL DELAY OF ULTRASOUND SIGNALS UPON RECEPTION THEREOF

[75] Inventor: Ulrich Saugeon, Nuremburg, Fed. Rep. of Germany

[73] Assignee: Siemens Aktiengesellschaft, Berlin and Munich, Fed. Rep. of Germany

[21] Appl. No.: 46,512

[22] Filed: May 6, 1987

[30] Foreign Application Priority Data

May 16, 1986 [DE] Fed. Rep. of Germany ....... 3616498

[51] Int. Cl.$^4$ ............................................. A61B 10/00
[52] U.S. Cl. ................................. 128/661.01; 73/625; 367/103
[58] Field of Search ................... 128/660, 661; 73/602, 73/625, 6232; 333/151, 152; 342/375, 379–381; 367/103, 105, 123

[56] References Cited

U.S. PATENT DOCUMENTS

| | | | |
|---|---|---|---|
| 3,859,622 | 1/1975 | Hutchison et al. ............. | 367/105 X |
| 4,060,792 | 11/1977 | van Heyningen ............. | 367/123 X |
| 4,070,642 | 1/1978 | Iinuma et al. ................. | 73/620 |
| 4,080,838 | 3/1978 | Kurda et al. .................. | 73/612 |
| 4,099,419 | 7/1978 | Kuroda et al. ................. | 73/626 |
| 4,127,034 | 11/1978 | Lederman et al. ............. | 73/626 |
| 4,285,011 | 8/1981 | Sato ............................. | 73/626 X |
| 4,561,308 | 12/1985 | Bele et al. ..................... | 73/626 |
| 4,628,738 | 12/1986 | Burckhardt et al. ............ | 73/626 |
| 4,700,573 | 10/1987 | Savard .......................... | 73/625 |

FOREIGN PATENT DOCUMENTS

| | | | |
|---|---|---|---|
| 0091375 | 10/1983 | European Pat. Off. ........... | 128/625 |
| 2158329 | 11/1985 | United Kingdom ............... | 128/625 |

OTHER PUBLICATIONS

"Donar: A Computer Processing System to Extend Ultrasonic Pulse-Echo T-Sting", Lees et al., Ultrasonics, Jul. 1973, vol. 11, No. 4, pp. 165–173.

Primary Examiner—Francis J. Jaworski

[57] ABSTRACT

A method and apparatus for digitally delaying ultrasound signals, which are reflected from a boundary surface inside of an examination subject, upon reception of the signals at an ultrasound receiver employ, in each channel, a shift register, a first multiplexer, another register, and interpolator and a further multiplexer to effect a selected delay. A number of interpolated ultrasound signals is formed from two successively received ultrasound signals. If the successive ultrasound signals are shifted by $\Delta\tau$, the interpolated ultrasound signals will be shifted by a smaller time difference relative to each other, dependent on the fineness of the interpolation. That interpolated ultrasound signal or that received ultrasound signal having a delay value which is closest to a selected desired delay value is employed for further signal processing. A high precision in the chronological resolution can thus be achieved with a relatively low sampling rate in comparison to the chronological resolution.

16 Claims, 1 Drawing Sheet

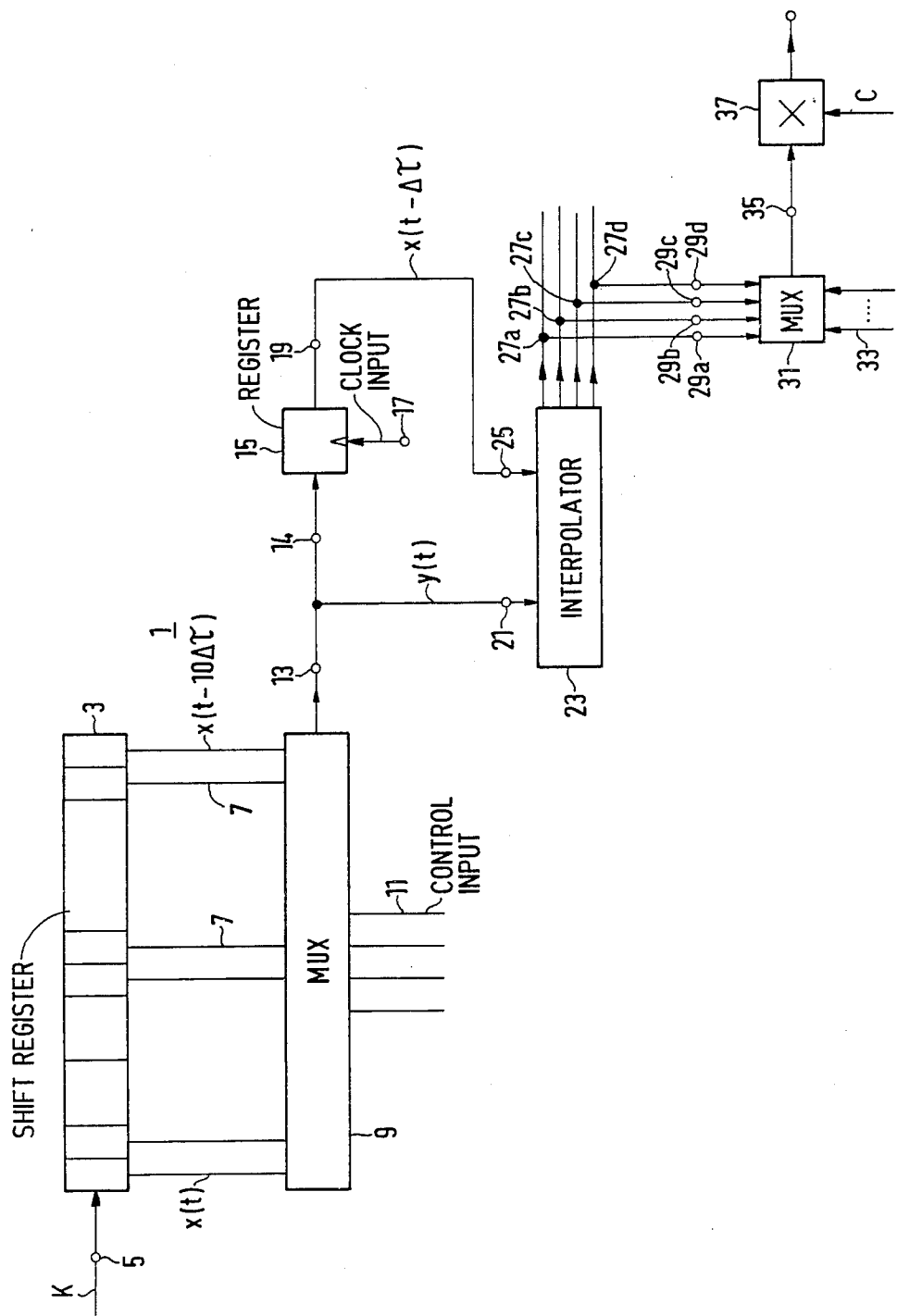

METHOD AND APPARATUS FOR DIGITAL DELAY OF ULTRASOUND SIGNALS UPON RECEPTION THEREOF

BACKGROUND OF THE INVENTION

1. Field of the Invention

The present invention is directed to a method and apparatus for digitally delaying an ultrasound signal upon reception thereof, and in particular to such a method and apparatus for use with a phased-array consisting of a plurality of ultrasound transducer elements.

2. Description of the Prior Art

The delay of ultrasound echoes is one of the crucial problems in medical ultrasound technology. Analog method and devices are known such as, for example, LC lines, mixed technologies, and CCD elements have heretofore been preferred for use at the receive side of the system. Digital delay methods are generally used only at the transmit side of the system.

A complicated delay technique is necessary, particularly given phased array devices having dynamic focussing of the reception focus over many focus locations. Relatively long delay times of up to, for example, 20 μs are standard for the sweep of the ultrasound signal. The curvature of the antenna, which differs dependent on the received focus location, is achieved by finer delay steps between adjacent transducer elements. The image quality of a displayed ultrasound image is improved, as is the sharpness of the representation, as one better succeeds in setting and observing computationally identified delay times. Time differences of only about 50 or 33 nsec are usually realizeable due to the clock signal of, for example, 20 or 30 MHz prescribed in the ultrasound apparatus.

SUMMARY OF THE INVENTION

It is an object of the present invention to provide a method and apparatus which enable a time delay to be achieved with high precision while maintaining a low scan frequency relative to the chronological resolution of the incoming signals.

The above object is achieved in a method wherein a digitally functioning delay means is provided, and a plurality of interpolated ultrasound signals is formed from two successively received ultrasound signals. That interpolated or received ultrasound signal which comes closest to a predetermined delay value is employed for further signal processing.

An apparatus for practicing the above method has, for each channel, a shift register to which the successive received ultrasound signals are supplied. The outputs of the shift register are connected to a first multiplexer, the output thereof being connected both to a further register and to an interpolator. The further register delays one of the successively received ultrasound signals with respect to a chronologically adjacent received signal, and the received signal and the delayed signal are supplied to the interpolator. From these two signals, the interpolator forms a plurality of interpolated ultrasound signals lying between the two input signals. All of the signals are supplied to another multiplexer, and the signal among the received signals and the interpolated signals which is closest to a desired delay value is supplied to the output of the further multiplexer, and is employed for further processing.

A high precision of the delay time in the region of, for example, 1/20 of the wavelength or better is achieved with the above method and apparatus. A relatively low scan frequency is thereby achieved in comparison to the chronological resolution. If, for example, the interpolator generates three interpolated ultrasound signals, i.e., three further signals, from two successive ultrasound signals received 50 nsec apart (corresponding to a clock frequency of 20 MHz), a precision in the fine delay can be achieved comparable to conventional systems scanning at 80 MHz.

A further advantage of the digital processing of the received ultrasound signal is the possibility of multiplication of the ultrasound signal by a constant. A dynamic, continuous aperture disconnection or aperture occupation (weighting) can thus be introduced. The ultrasound transducer elements disposed at the edge of the antenna are multiplied by a smaller factor than those ultrasound elements disposed in the middle of the antenna. A further advantage of the digital delay technology at the received side is that switching spikes are avoided, which arise in conventional systems when switching from one delay value to another. Many focus positions are thus possible during the reception of an ultrasound vector. An exact, dynamic focussing can also be undertaken given large apertures.

The digital components can be manufactured in integrated form with a high density, and this also permits very long delay times to be realized in a simple manner. Factors which digitally influence the delay time such as, for example, the length of the shift register or the number to which a counter counts up or down are freely selectable without having to accept losses in precision.

DESCRIPTION OF THE DRAWINGS

The single FIGURE is a schematic block diagram of an apparatus for digitally delaying received ultrasound signals operating according to the method disclosed herein.

DESCRIPTION OF THE PREFERRED EMBODIMENTS

The components in accordance with the principles of the present invention for one channel K at the receive side of a phase-array ultrasound system, such as may be used in the medical field, are shown in the drawing, the delay means being generally referenced at 1.

The delay means 1 includes a shift register 3 having an input 5 and a plurality of outputs 7. The outputs 7 of the shift register 3 are supplied to a like number of inputs of a first multiplexer 9. The multiplexer 9 also has a control input 11 and an output 13. Dependent on a control signal at the control input 11, one of the outputs 7 of the shift register 3 is connected through to the output 13 of the first multiplexer 9.

The output 13 of the first multiplexer 9 is supplied to the input 14 of a register 15. The register 15 also has a clock input 17, and an output 19. An ultrasound signal $x(t)$ at the input 14 of the register 15 is entered in the register 15 upon the occurrence of the next clock signal at the input 17. An ultrasound signal $x(t - \Delta\tau)$ is then present at the output 19 of the register 15, whereby $\Delta\tau$ is the chronological difference (spacing) between the two clock signals. At the same time, the next successive ultrasound signal $y(t)$, which was through-connected from the shift register 3 via the first multiplexer 9 in the same manner as described above, is entered at the input 14 of the register 15. The output 13 of the multiplexer 9 is also supplied to a first input 21 of an interpolator 23.

The output 19 of the register 15 is supplied to a second input 25 of the interpolator 23.

The interpolator 23 has four outputs 27a, 27b, 27c and 27d at which signals are respectively present which are different combinations (mixes) of the two ultrasound signals y(t) and x(t−Δτ) simultaneously present at the inputs 21 and 25. If the ultrasound signal at the first input 21 has, for example, the value y and the ultrasound signal at the second input 25 has the value x, the interpolator 23 may produce signals at its output such as, for example, the value x at output 27a, the output $3x/4+y/4$ at the output 27b, the value $x/2+y/2$ at the output 27c, and the value $x/4+3y/4$ at the output 27d. The interpolator 23 thus can undertake a linear interpolation between the two ultrasound values x and y. Other types of mathematical interpolations can be used with the same advantage.

The outputs 27a through 27d of the interpolator 23 are respectively connected to inputs 29a, 29b, 29c and 29d of a further multiplexer 31. The further multiplexer 31 has a control input 33 and an output 35. The output 35 of the further multiplexer 31 may, for example, be supplied to a multiplier 37 for further signal processing. The multiplier 37 will be described in greater detail below. Multiplication by a factor C is undertaken therein.

The details of the method for delaying an ultrasound signal which is reflected from the boundary surface inside an examination subject, and which is received by the phase-array antenna is as follows. The reflected ultrasound signal x(t) enters at the input 5 of the shift register 3. The ultrasound signal x(t), for example, is the echo of a transmission signal which was transmitted with a mean frequency of, for example, 4 MHz. A clock frequency of 20 MHz, for example, may be employed for acquisition of the curve of the echo signal. At 20 MHz, the time between two clock signals is 50 nsec. This sampling frequency is also employed for further clocking of the digital components, i.e., the shift register 3, the multiplexer 9, the register 15, the interpolator 23 and the further multiplexer 31. If, for example, the shift register 3 is 500 nsec "long" it will have 10 outputs 7 at which output signal are present each delayed by Δτ50 nsec relative to each other. The ultrasound signal x(t) can thus be delayed in the shift register 3 quantized in steps of Δτ=50 nsec.

In accord with the desired focus location for the transducer element connected to the channel K, however, it is assumed for this example that a total delay τ of, for example, 235 nsec is desireable. In conventional devices without an interpolator 23, the closest value, i.e., 250 nsec, would have to be used as the delay time from the shift register, accepting an error of 15 nsec.

The method and apparatus disclosed herein, however, permit the desired delay to be achieved with much less error. Via the first multiplexer 9, the delay value, rounded to n xΔτ, is supplied to the output 13. With reference to the example of 235 nsec, this is a delay of 200 nsec, so that the fourth output of the shift register 3 is supplied through the multiplexer 9 to its output 13. This is achieved by supply of a control signal to the multiplexer 9 via the control input 11 from a central control means (not shown). The ultrasound signal x(t−4Δτ), wherein n−4 is thus present at the output 13 of the first multiplexer 9. This ultrasound signal is entered in the register 15 and is read therefrom one clock period (50 nsec) later. An echo signal x(t−5Δτ) is then present at the output 19 of the register 15, and this signal is forwarded to the second input 25 of the interpolator 23. The next ultrasound signal y(t−4Δτ), shifted by only 4Δτ, is simultaneously present at the output 13 of the multiplexer 9, and thus at the other input 21 of the interpolator 23.

Two ultrasound signals x(t) and y(t) which are chronologically shifted by one clock period, i.e., by Δτ, are thus always present at the two inputs 21 and 25 of the interpolator 23. This is indicated in the drawing with the symbols y(t) at the first input 21 and x(t−Δτ) at the second input 25 of the interpolator 23. The earlier (older) ultrasound signal is thus always present at the second input 25 of the interpolator 23.

For the case of a linear interpolator 23 as described above, the values for the ultrasound signals at the outputs 27a through 27d of the interpolator 23 are the value x at output 27a, the value $\frac{3}{4}x+\frac{1}{4}y$ at output 27b, the value $x/2+y/2$ at output 27c and the value $\frac{1}{4}x+\frac{3}{4}y$ at the output 27d. One clock period Δτ further, the value at the output 27a would equal y, the value at the output 27b would equal $\frac{3}{4}y+\frac{1}{4}z$, the value at the output 27c would equal $\frac{1}{2}y+\frac{1}{2}z$, and the value at the output 27d $\frac{1}{4}y+\frac{3}{4}z$, whereby z denotes the ultrasound signal following the ultrasound signal y at the next clock signal.

Returning to the numerical example, the ultrasound signal x is delayed by 250 nsec, and the ultrasound signal y at the input 14 of the register 15 is delayed by only 200 nsec. An ultrasound signal delayed by a delay value of 235 nsec is, however, desired. As a consequence of the interpolation, the four values of the ultrasound signals at the respective outputs 27a through 27d are as follows: the ultrasound signal at the output 27a is valid for a delay of 250 nsec, the ultrasound signal at the output 27b is valid for a delay of 237.5 nsec, the ultrasound signal at the output 27c is valid for a delay of 225 nsec, and the ultrasound signal at the output 27d is valid for a delay of 212.5 nsec. For the desired delay value of 235 nsec, therefore, the output 27b has the signal with the closest delay valued (237.5 nsec). This signal is therefore to be through-connected via the further multiplexer 31 to the output 35 thereof for further processing. An error of only 2.5 nsec (instead of 15 nsec without interpolation) is present. The value that the ultrasound image signal could have had, given a delay of 235 nsec in the receiver, is thus identified using interpolation. A more exact identification of the value was not possible due to the clock frequency which corresponds to a time difference of 50 nsec.

The method described above for a single ultrasound channel K can be used in all channels, or can be used only in some channels, as needed.

The ultrasound signal connected through the multiplexer 31, based on signals supplied to the control input 33 thereof, is then processed further as though it were directly supplied at the output of the first multiplexer 9 in accord with any suitable method. The chronological shift by a clock period Δτ thus has no negative influence on the image quality.

One type of further processing which can be used to particular advantage due to the fact that the above-described method is a digital method, is multiplication of the ultrasound signal by a constant. A weighting of all delay channels can thus be undertaken, and an aperture occupation function (weighting function) can thus be realized. The aperture occupation function may be shaped according to a cosine curve, or according to a cosine squared curve. As a result of this aperture occupation, the minor lobe amplitudes are reduced relative to the major lobe of the antenna, and ambiguities in the direction of the antenna pattern are thus reduced. Given a constant propagation medium (for example water) in the normal direction of the antenna, the aperture occupation is symmetrical relative to the middle of the array. This symmetry is lost given large pivoting angles, and is also lost due to the echo attenuation of the non-uniform propagation medium, for example in human tissue. This system-condition weighting can be compensated within certain limits by the use of the multiplier 37 in each delay channel K. The amplitude changes of the delay channels caused by the interpolation or by the phase relation of the scanning can also be compensated within certain limits by multiplication with a constant C. The multiplier 37 may also be used to test, for example, a self-test, the ultrasound apparatus, because each datum of the digital resolution range can be dynamically and statically set for each delay channel K. The disconnection of some or all channels K of the ultrasound apparatus is also possible in this manner.

An advantage of the method and apparatus disclosed herein is a high precision of the time delay (a precision of +6.25 nsec in the example of the embodiment) given a relatively low sampling frequency of 20 MHz. The relationship of sampling frequency to chronological resolution is thus significantly improved in comparison to convention devices without interpolation. Dependent on the length of the shift register 3, extremely long delay times of up to 20 μsec and more can be selected. The chronological resolution can be made even finer, and is dependent on the circuit outlay which is still acceptable in the case of the interpolation. Thus, for example, an interpolator 23 having eight outputs is also possible. Interpolation techniques other than the above-described linear interpolation may also be used.

Further advantages derive from the utilization of digital technology at the receive side of the system. For example, multiplication of the value of the ultrasound echo signal by the constant C for continuous aperture occupation is possible. Given switching to a different time delay stage or level, corresponding to a different focus location during an ultrasound line, due to the digital technology no switching spikes occur. This means that many focus locations are possible during reception of an ultrasound vector without the creation of image disturbances due to spikes. Moreover, the possibility of undertaking exact dynamic focussing given large apertures is also available.

Although modifications and changes may be suggested by those skilled in the art it is the intention of the inventor to embody within the patent warranted hereon all changes and modifications as reasonably and properly come within the scope of his contribution to the art.

I claim as my invention:

1. A method for delaying by a desired amount digital ultrasound signals received in a channel, said received digital ultrasound signals being chronologically spaced in a series, which chronological spacing is substantially the same as a sample period according to a clock signal, said method comprising the steps of:
   digitally delaying a first received ultrasound signal by a selected delay which is an integer multiple of said sample period;
   digitally forming a plurality of interpolated signals from said delayed first received ultrasound signal and from a next successively delayed received ultrasound signal in said series; and
   selecting for further processing one among said delayed ultrasound signals and said plurality of interpolated signals which has a delay closest to said desired amount.

2. A method as claimed in claim 1, wherein the step of digitally forming a plurality of interpolated signals is further defined by digitally forming a plurality of linearly interpolated signals from said delayed first received ultrasound signal and from said next successively delayed received ultrasound signal in said series.

3. A method as claimed in claim 1, wherein the step of digitally forming a plurality of interpolated signals is further defined by digitally forming three interpolated signals from said delayed first delayed received ultrasound signal and said next successively received ultrasound signal in said series.

4. A method as claimed in claim 1, wherein the step of digitally forming a plurality of interpolated signals is further defined by digitally forming three linearly interpolated signals from said delayed first received ultrasound signal and from said next successively delayed received ultrasound signal in said series.

5. A method as claimed in claim 1, wherein the step of digitally delaying a first received ultrasound signal by a selected delay is further defined by the steps of:
   supplying said first received ultrasound signal to a shift register having a plurality of outputs, the signal at each of said plurality of outputs being delayed by successively incremental amounts which are integer multiples of said sample period,
   supplying the outputs of said shift register to a like plurality of inputs of a multiplexer, said multiplexer having a control input and an output; and
   through-connecting by a signal on said control input the output signal of said shift register having a delay most closely approximating said desired amount to said output of said multiplexer.

6. A method as claimed in claim 1 comprising the additional step of:
   multiplying the selected one of said signals by a constant selected for weighting the output of said channel.

7. An apparatus for use in an ultrasound system for delaying by a desired amount ultrasound signals received in a channel, said received ultrasound signals being chronologically spaced in a series, which chronological spacing is substantially the same as a sample period according to a clock signal, said apparatus comprising:
   means for digitally delaying a first received ultrasound signal by a selected delay which is an integer multiple of said sample period;
   means for digitally forming a plurality of interpolation signals from said delayed first received ultrasound signal and said next successively delayed received ultrasound signal in said series; and
   means for selecting for further processing one among said delayed ultrasound signals and said plurality of interpolated signals which has a delay closest to said desired amount.

8. An apparatus as claimed in claim 7, wherein said means for digitally delaying comprises:
   a shift register to which said first received ultrasound signal is supplied, said shift register having a plurality of outputs with the signal at each output being delayed by successively incremental amounts which are integer multiples of said sample period; and a multiplexer having a plurality of inputs respectively connected to the outputs of said shift register, a control input and an output, said multiplexer, in response to a signal at said control input, through-connecting an output of said shift register having a delay most closely approximating said desired amount to the output of said multiplexer.

9. An apparatus as claimed in claim 7, wherein said means for digitally forming a plurality of interpolated signals is a means for digitally forming a plurality of linearly interpolated signals from said delayed first received ultrasound signal and said next successively delayed received ultrasound signal in said series.

10. An apparatus as claimed in claim 7, wherein said means for digitally forming a plurality of interpolated signals is a means for digitally forming three interpolated signals from said delayed first received ultrasound signal and said next successively delayed received ultrasound signal in said series.

11. An apparatus as claimed in claim 7, wherein said means for digitally forming a plurality of interpolated signals is a means for digitally forming three linearly interpolated signals from said delayed first received ultrasound signal and said next successively delayed received ultrasound signal in said series.

12. An apparatus as claimed in claim 7, wherein said means for digitally forming a plurality of interpolated signals comprises:

a register to which said delayed first received ultrasound signal is supplied, said register holding said delayed first received ultrasound signal therein for an amount of time corresponding to said chronological spacing of said ultrasound signals in said series and thereafter releasing said delayed first received ultrasound signal; and an interpolator having a first input connected to the output of said means for digitally delaying and a second input connected to the output of said register such that said delayed first received ultrasound signal and said next successively delayed received ultrasound signal are simultaneously supplied to said first and second inputs.

13. An apparatus as claimed in claim 7, further comprising:

means for multiplying the selected one of said signals by a constant for weighting the output of said channel.

14. An apparatus for use in an ultrasound system for delaying by a desired amount digital ultrasound signals received in a channel, said received ultrasound signals being chronologically spaced in a series, which chronological spacing is substantially the same as a sample period according to a clock signal, said apparatus comprising:

a shift register to which said ultrasound signals are supplied, said shift register having a plurality of outputs at which a first received ultrasound signal is present delayed by respective successively incremental delays, each of which is an integer multiple of said sample period;

a first multiplexer having a plurality of inputs respectively connected to the outputs of said shift register, a control input, and an output, first multiplexer, in response to a signal at said control input, through-connecting an output of said shift register having a delay closest to said desired amount to the output of said first multiplexer;

a further register having an input to which the delayed first received ultrasound signal from the output of said first multiplexer is supplied, said further register holding said delayed first received ultrasound signal therein for a period of time corresponding to said chronological spacing of said signals in said series, and thereafter releasing said delayed first received said ultrasound signal;

an interpolator having a first input to which said next successively delayed received ultrasound signal in said series is supplied, and a second input to which said delay first received ultrasound signal from said further register is simultaneously supplied, said interpolator digitally forming a plurality of interpolated signals from the signals at said first and second inputs thereof at a plurality of interpolator outputs; and a second multiplexer having a plurality of inputs respectively connected to said plurality of interpolator outputs, and having a control input, said second multiplexer, in response to a signal at said control input, selecting one of the signals at said interpolator outputs having a delay which is closest to said desired amount.

15. An apparatus as claimed in claim 14, wherein said interpolator has one of said interpolator outputs at which said first received ultrasound signal is present.

16. An apparatus as claimed in claim 14, further comprising:

a multiplier having an input connected to an output of said second multiplexer to which the selected one of said signals is supplied, said multiplier multiplying said selected signal by a constant for weighting the output of said channel.

* * * * *